United States Patent [19]

Holdren et al.

[11] Patent Number: 5,090,243

[45] Date of Patent: Feb. 25, 1992

[54] PRELOAD SYSTEM FOR ACCELEROMETER

[75] Inventors: Frederick V. Holdren, Bellevue; Mitchell J. Novack, Kirkland; Charles J. Rupnick, Seattle, all of Wash.

[73] Assignee: Sundstrand Data Control, Inc., Redmond, Wash.

[21] Appl. No.: 535,788

[22] Filed: Jun. 11, 1990

[51] Int. Cl.⁵ ............................................. G01P 15/00
[52] U.S. Cl. ..................................... 73/514; 73/517 B; 73/431
[58] Field of Search .......... 73/517 R, 517 B, 517 AV, 73/431, 493, 514, 651

[56] References Cited

U.S. PATENT DOCUMENTS

| | | | |
|---|---|---|---|
| 3,605,503 | 9/1971 | Morrow | 73/517 R |
| 4,373,378 | 2/1983 | Fujishiro et al. | 73/651 |
| 4,555,944 | 12/1985 | Hanson et al. | 73/517 B |

Primary Examiner—John E. Chapman
Attorney, Agent, or Firm—Christensen, O'Connor, Johnson & Kindness

[57] ABSTRACT

An improved preload system for an accelerometer in which an acceleration sensitive structure is clamped between first and second clamping members. The acceleration sensitive structure includes a paddle supported such that the paddle has a degree of freedom along a sensing axis. The accelerometer further includes a case within which the acceleration sensitive structure and clamping members are mounted. The preload system comprises an internal mounting surface in the case that faces in a first direction along the sensing axis, and that contacts the second clamping member and prevents it from moving in a second direction opposite to the first direction. The preload system also includes a spring washer extending between the first clamping member and the case, such that the spring washer exerts a force on the first clamping member in the second direction. A positioning ring may also be provided between the first clamping member and spring washer, to laterally locate the first clamping member within the case.

6 Claims, 3 Drawing Sheets

PRELOAD SYSTEM FOR ACCELEROMETER

FIELD OF THE INVENTION

The present invention relates to accelerometers in which an acceleration sensitive structure is mounted between a pair of clamping members within a case.

BACKGROUND OF THE INVENTION

A prior art accelerometer with high performance potential is described in U.S. Pat. No. 3,702,073. The accelerometer comprises three primary components, a reed, and upper and lower stators or magnetic circuits between which the reed is supported. The reed includes a movable paddle that is suspended via flexures to an outer annular support ring, such that the paddle can pivot with respect to the support ring. The paddle, flexures and support ring are commonly provided as a unitary structure composed of fused quartz.

Both upper and lower surfaces of the paddle include capacitor plates and force rebalancing coils. Each force rebalancing coil is positioned on the paddle such that the central axis of the coil is normal to the top and bottom surfaces of the paddle, and parallel to the sensing axis of the accelerometer. A plurality of mounting pads are formed at spaced-apart positions around the upper and lower surfaces of the annular support ring. These mounting pads mate with inwardly facing surfaces of the upper and lower stators when the accelerometer is assembled.

Each stator is generally cylindrical, and has a bore provided in its inwardly facing surface. Contained within the bore is a permanent magnet. The bore and permanent magnet are configured such that an associated one of the force balancing coils mounted on the paddle fits within the bore, with the permanent magnet being positioned within the cylindrical core of the coil. Current flowing through the coil therefore produces a magnetic field that interacts with the permanent magnet to produce a force on the paddle. Also provided on the inwardly facing surfaces of the stators are capacitor plates configured to form capacitors with the capacitor plates on the top and bottom surface of the paddle. Thus movement of the paddle with respect to the upper and lower stators results in a differential capacitance change.

In operation, the accelerometer is affixed to an object whose acceleration is to be measured. Acceleration of the object along the sensing axis results in pendulous, rotational displacement of the paddle with respect to the support ring and the stators. The resulting differential capacitance change caused by this displacement is sensed by a feedback circuit. In response, the feedback circuit produces a current that, when applied to the force balancing coils, tends to return the paddle to its neutral position. The magnitude of the current required to maintain the paddle in its neutral position provides a measure of the acceleration along the sensing axis.

In an accelerometer of the type described above, the reed or acceleration sensitive structure is clamped between the upper and lower stators. The "preload" force required to clamp the reed between the stators is commonly provided by means of a band, commonly known as a belly band, that encircles the reed and the adjacent stator portions, and that is bonded to the stators. The advantage of such a preload system is that it exerts the preload force about the peripheries of the stators, adjacent to the mounting pads, thereby minimizing the introduction of uneven preload forces. However, the disadvantage of such a preload technique is that if subsequent testing of the accelerometer indicates that rework is required, it is relatively difficult to disassemble the accelerometer without damaging one or more of its components.

SUMMARY OF THE INVENTION

The present invention provides an improved preload system for an accelerometer of the type described above, in which an acceleration sensitive structure is clamped between upper and lower clamping members such as stators, damping plates or the like. A principal advantage of the preload system of the invention is that the accelerometer is relatively easy to disassemble and rework.

In a preferred embodiment, the preload system of the present invention is implemented in an accelerometer that comprises an acceleration sensitive structure that includes a paddle supported such that the paddle has a degree of freedom along a sensing axis. The accelerometer also includes first and second clamping members positioned on opposite sides of the acceleration sensitive structure, for clamping the acceleration sensitive structure therebetween. The accelerometer further includes a case within which the acceleration sensitive structure and the clamping members are mounted. The improved preload system comprises an internal mounting surface in the case that faces in a first direction along the sensing axis, the mounting surface contacting the second clamping member such that the mounting surface prevents the second clamping member from moving in a second direction opposite to the first direction. The preload system also includes spring means extending between the first clamping member and the case, such that the spring means exerts a force on the first clamping member in the second direction. A positioning ring may also be provided between the first clamping member and the spring means, to laterally locate the first clamping member within the case.

DETAILED DESCRIPTION OF THE INVENTION

Figure 1:
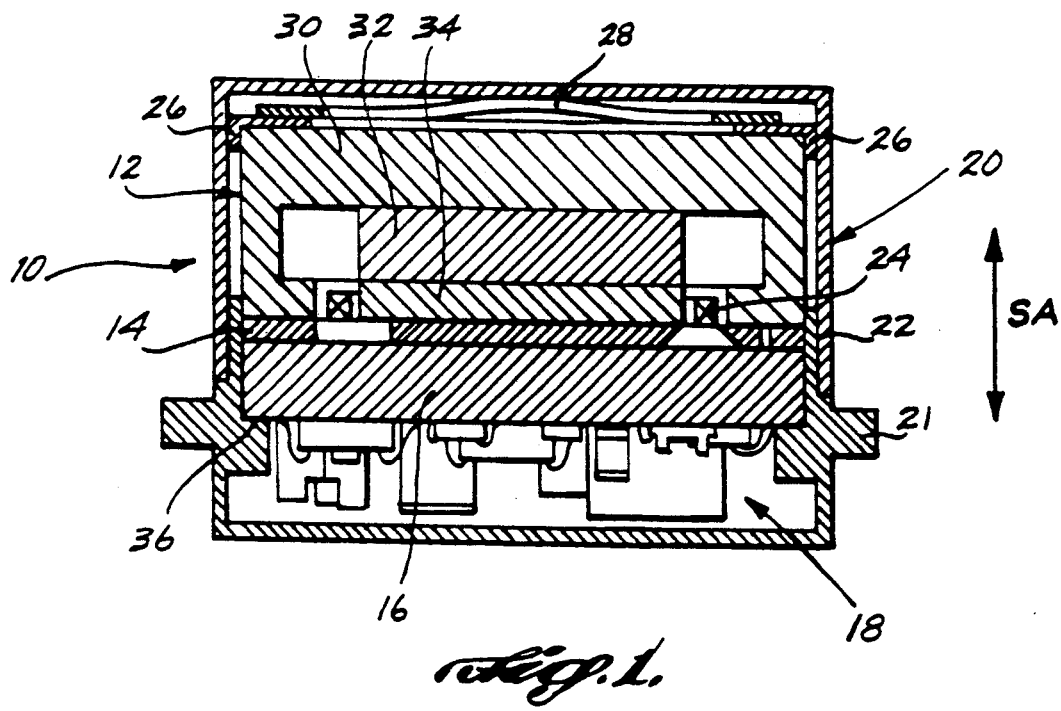
FIG. 1 is a cross-sectional view of an accelerometer that includes the preload system of the present invention.
Figures 2, 3:
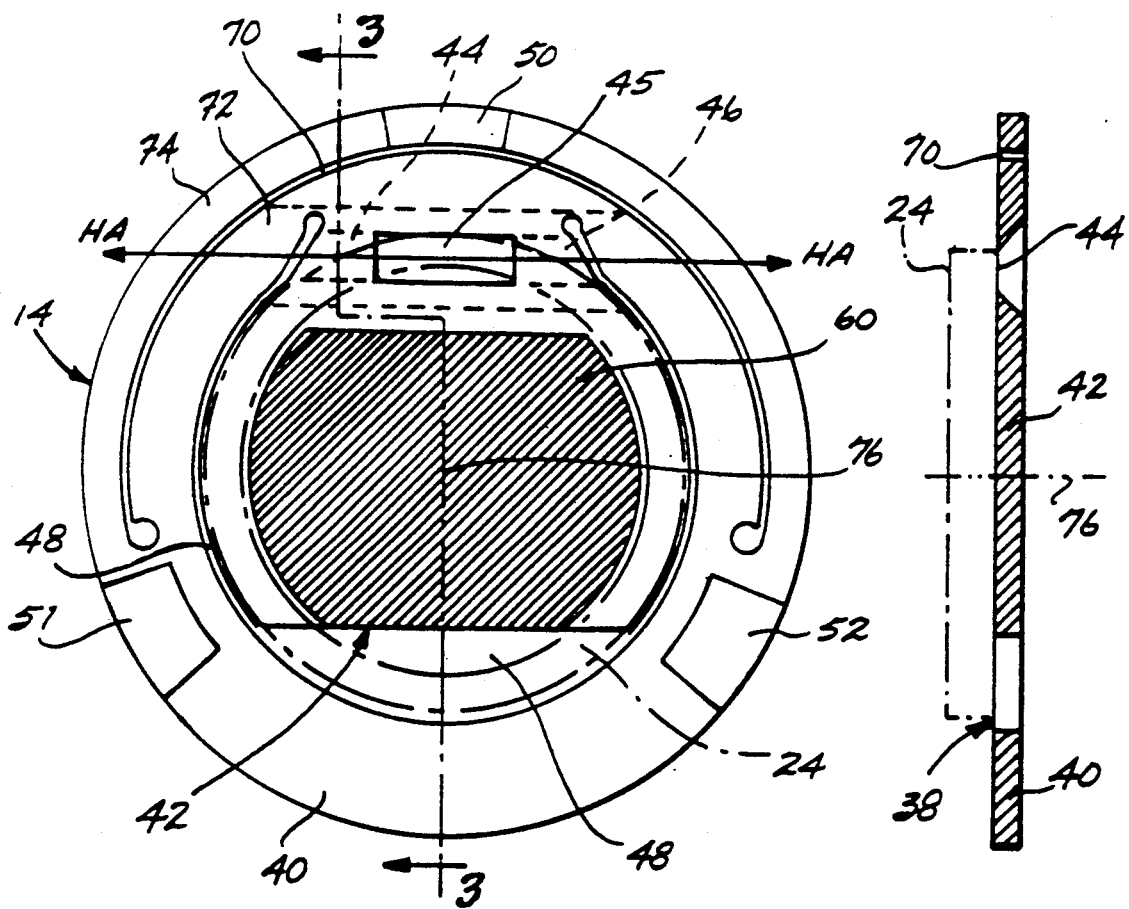
FIG. 2 is a top plan view of the reed of the accelerometer of FIG. 1.
FIG. 3 is a cross-sectional view taken along line 3—3 of FIG. 2.

FIGS. 1-3 illustrate an accelerometer that includes a preload system in accordance with the present invention. The accelerometer 10 measures acceleration along sensing axis SA, and includes stator 12, reed 14, plate 16, and electronics assembly 18, all mounted within case 20 formed by mounting flange 21 and cap 22. Reed 14 is held between plate 16 and stator 12, and has coil 24 positioned on its upper surface. Stator 12 in turn bears against cap 22 via positioning ring 26 and spring washer 28. Thus for this embodiment, reed 14 comprises the acceleration sensitive structure, and plate 16 and stator 12 comprises the clamping members.

The stator comprises excitation ring 30, magnet 32 and pole piece 34. The stator is shaped so that coil 24 occupies a comparatively narrow gap between pole piece 34 and excitation ring 30, to provide the force rebalancing function well known to those skilled in the art. Plate 16 is held against reed 14 by inner shoulder 36 of mounting flange 21, and the mounting flange and cap 22 are interconnected by welding or by any other suitable process to form case 20. Plate 16 is formed from an electrically insulating material, preferably a ceramic. Suitable means (not shown) are provided for electrically interconnecting electronics assembly 18 with reed 14, and for coupling the electronics assembly to an electrical connector on the outer surface of mounting flange 21.

Reed 14 is shown in greater detail in FIGS. 2 and 3. The reed has an overall disk-like shape, and includes annular support ring 40 and paddle 42 connected to one another via flexures 44 and 46 that are positioned on opposite sides of opening 45. For most of its perimeter, paddle 42 is separated from support ring 40 by gap 48. Three raised mounting pads 50, 51, and 52 are located at approximately equally spaced positions around the upper surface of support ring 40, and three similar mounting pads (not shown) are located immediately beneath the pads 50-52 on the lower surface of the support ring. In the assembled accelerometer, the upper mounting pads contact stator 12, while the lower mounting pads contact plate 16.

Paddle 42 is mounted via flexures 44 and 46 such that the paddle can pivot with respect to support ring 40 about hinge axis HA that passes through the flexures and that is horizontal and parallel to the plane of the drawing in FIG. 2. Coil 24 is mounted on the upper surface of paddle 42, such that the outer edge of the coil is approximately coextensive with the outer edge of the paddle, except adjacent flexures 44 and 46 where the coil overhangs the flexures and opening 45. Capacitor plate 60 is positioned on the upper surface of paddle 42 within the area bounded by coil 24, and forms a capacitor with the adjacent surface of pole piece 34, or with a second capacitor plate located on the lower surface of the pole piece. The capacitor forms a portion of a pick-off circuit for detecting movement of the paddle from its null position. A second capacitor may be formed between a capacitor plate on the lower surface of paddle 42 and a capacitor plate on the upper surface of plate 16.

A portion of support ring 40 adjacent to the flexures is divided by slot 70 into inner ring 72 and outer ring 74. Mounting pad 50 and the corresponding mounting pad located on the lower surface of the support ring are positioned on outer ring 74 only, and the flexures are connected to inner ring 72. As a result of this arrangement, stress coupled into reed 14 via the mounting pads is isolated from the flexures. The split support ring approach allows mounting pad 50 to be located near the flexures, on outer ring 74, without creating direct mechanical coupling of the mounting pad to the flexure area of the support ring. In addition, the evenly spaced distribution of the mounting pads about the circumference of the support ring permits the center of preload force to be located almost anywhere within the diameter of the proof mass assembly. The preferred location is on centerline 76, to provide equal mounting pad loading. This low sensitivity with respect to the exact position of the center of preload force facilitates the use of the preload system of the present invention.

Figure 4:
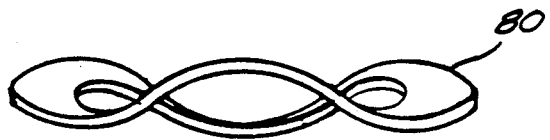
FIG. 4 is a side elevational view of a first preferred spring washer.
Figure 5:
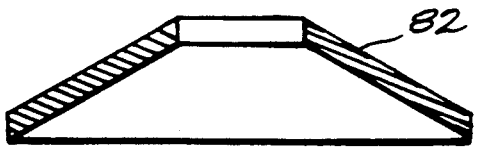
FIG. 5 is a cross-sectional view of a second preferred spring washer.

Two preferred embodiments of spring washer 28 are shown in FIGS. 4 and 5. FIG. 4 illustrates "wave" type spring washer 80. Wave spring washer 80 comprises a hollow cylindrical disk of metal, as in a conventional washer, in which the material from which the washer is made oscillates in an axial direction as one moves around the circumference of the washer. Thus the washer can be compressed axially between the stator and the case, as shown in FIG. 1. The number of points of support of washer 80 against cap 22 is equal to the number of axial oscillations around the washer circumference. For the purpose of the present invention, three or more axial oscillations are preferred, to provide at least three point support between the washer and the case and between the washer and the stator.

FIG. 5 illustrates a second embodiment of the spring washer, comprising belleville washer 82. Washer 82 comprises a truncated cone that is illustrated in cross section, and functions in a manner similar to that of wave spring washer 80. In the case of belleville spring washer 82, there is continuous contact between the washer and the adjacent structures as one moves circumferentially around the washer.

To assemble the accelerometer shown in FIGS. 1-3, the illustrated components are inserted into cap 22, beginning with spring washer 28, and ending with plate 16 to which electronics assembly 18 is attached. Mounting flange 21 is then fitted onto cap 22, the movement of the mounting flange onto the cap causing inner shoulder 36 to bear against plate 16, thereby compressing spring washer 28. The cap and mounting flange may then be secured to one another by any suitable process, such as by epoxy or other suitable adhesive. In the assembly process, positioning ring 26 and the uppermost extensions of mounting flange 21 serve to align the stator, reed and plate, without the need for tooling. In the assembled accelerometer, spring washer 28 compensates for tolerances (i.e., thickness variations) in the components enclosed within the case.

Figure 6:
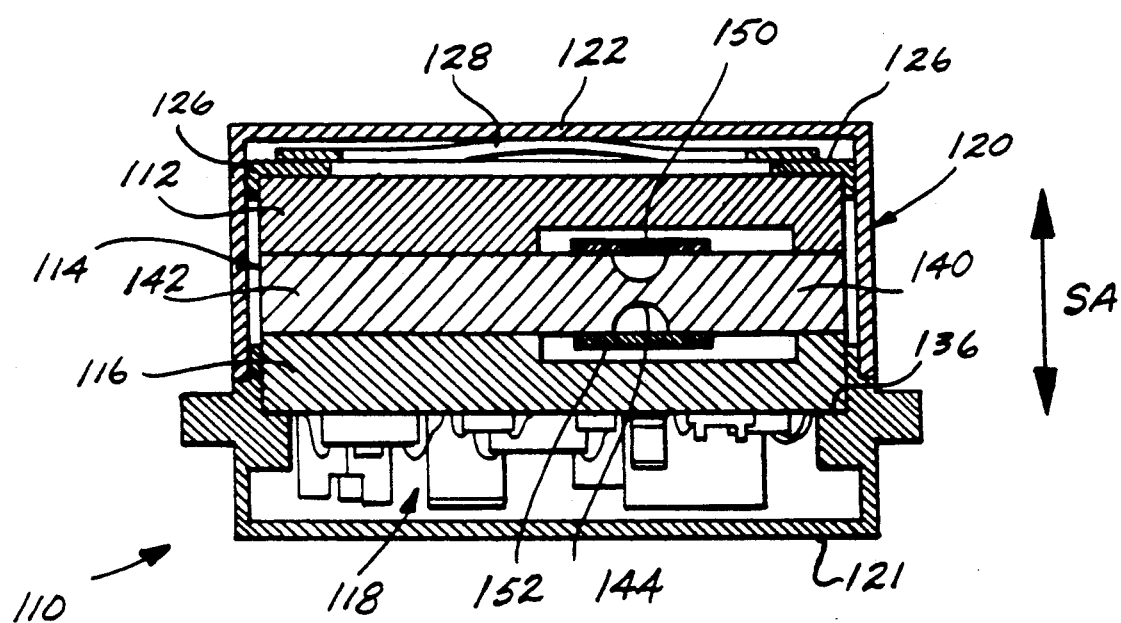
FIG. 6 is a schematic, cross-sectional view showing the preload system in use in a second type of accelerometer.

FIG. 6 illustrates the preload system of the present invention in a second type of accelerometer. Accelerometer 110 shown in FIG. 6 includes upper plate 112, reed 114, lower plate 116 and electronics assembly 118, all mounted within case 120 formed by mounting flange 121 and cap 122. Reed 114 comprises paddle 142 connected to support 140 via one or more flexures 144. Force sensing transducers 150 and 152 are connected between support 140 and paddle 142, and measure acceleration in a manner well known to those skilled in the art. Reed 114 is held between the upper and lower plates. The assembly comprising the plates and the reed is held between shoulder 136 of mounting flange 121, and positioning ring 126 that bears against cap 122 through spring washer 128. Thus the overall geometry of this embodiment is similar to that shown in FIGS. 1-3, with upper plate 112 generally replacing stator 12.

Figure 7:
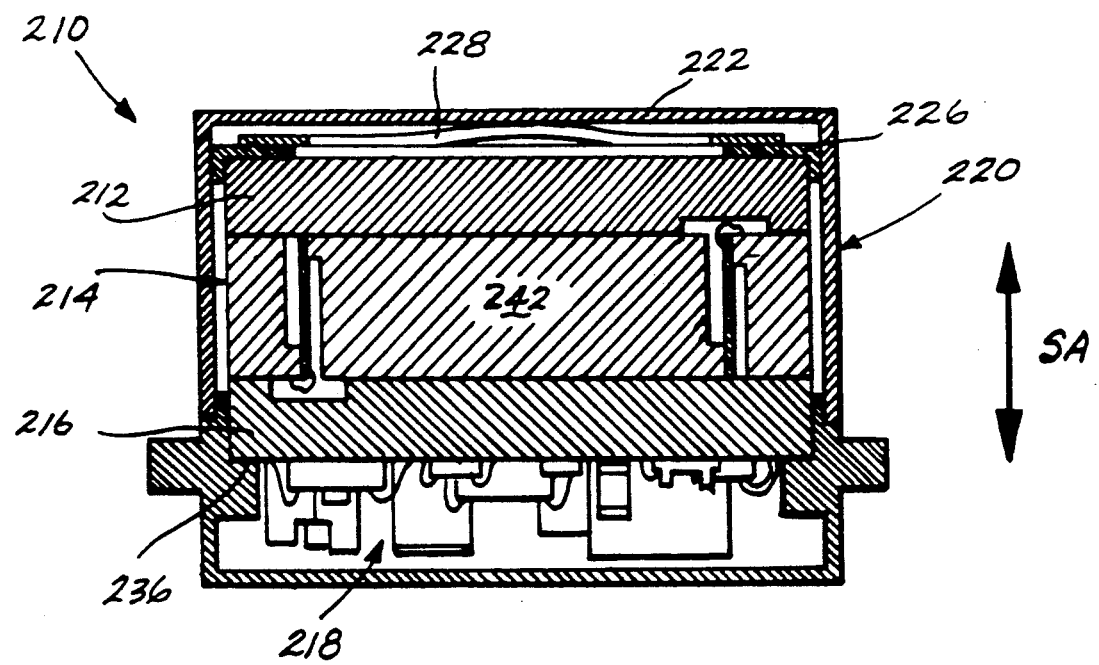
FIG. 7 is a schematic cross-sectional view showing the preload system in use in a third type of accelerometer.

FIG. 7 shows the preload system of the present invention in use in a third type of accelerometer. Accelerometer 210 is generally similar to accelerometer 110 shown in FIG. 6, except that reed 214 is configured as shown in U.S. Pat. No. 4,872,342. Once again, reed 214 is held between upper plate 212 and lower plate 216. Upper plate 212 is positioned within case 220 by positioning ring 226, and spring washer 228 is inserted between positioning ring 226 and cap 222. At the lower end of the suspended structure, mounting shoulder 236 bears against the underside of plate 216, and provides the compression for the spring washer.

While the preferred embodiments of the invention have been illustrated and described, variations will be apparent to those skilled in the art. For example, instead of the "wavy" spring washer shown in FIG. 4, a "finger" spring washer could be used instead. In a finger spring washer, a plurality of fingers (e.g., six) extend out of the plane of the washer to form the spring means. Accordingly, the scope of the invention is to be determined by reference to the following claims.

The embodiments of the invention in which an exclusive property or privilege is claimed are defined as follows:

1. In an accelerometer for measuring acceleration along a sensing axis, the accelerometer comprising:
    an acceleration sensitive structure comprising a paddle supported such that the paddle has a degree of freedom along the sensing axis;
    first and second clamping members positioned on opposite sides of the acceleration sensitive structure and adapted for clamping the acceleration sensitive structure therebetween; and
    a case within which the acceleration sensitive structure and clamping members are mounted;
    the improvement wherein:
        the case includes an internal mounting surface facing in a first direction along the sensing axis, the mounting surface contacting the second clamping member such that the mounting surface prevents the second clamping member from moving in a second direction opposite to the first direction, and spring means extending between the first clamping member and the case such that the spring means exerts a force on the first clamping member in the second direction, and wherein the accelerometer further comprises a positioning ring positioned between the spring means and the first clamping member, the positioning ring being shaped so as to position the first clamping member with respect to the case in at least one direction normal to the sensing axis.

2. The improvement of claim 1, wherein the spring means comprises a wave spring washer.

3. The improvement of claim 1, wherein the spring means comprises a belleville washer.

4. In an accelerometer for measuring acceleration along a sensing axis, the accelerometer comprising:
    an acceleration sensitive structure comprising a paddle supported such that the paddle has a degree of freedom along the sensing axis;
    first and second clamping members positioned on opposite sides of the acceleration sensitive structure and adapted for clamping the acceleration sensitive structure therebetween; and
    a case within which the acceleration sensitive structure and clamping members are mounted and fully enclosed;
    the improvement wherein:
        the case comprises a mounting structure and a cap that are joined together during assembly of the accelerometer to form the case, the mounting structure including an internal mounting surface facing in a first direction along the sensing axis, the mounting surface contacting the second clamping member such that the mounting surface prevents the second clamping member from moving in a second direction opposite to the first direction, and spring means extending between the first clamping member and the cap such that the spring means exerts a force on the first clamping member in the second direction, and wherein the accelerometer further comprises a positioning ring positioned between the spring means and the first clamping member, the positioning ring being shaped so as to position the first clamping member with respect to the case in at least one direction normal to the sensing axis.

5. The improvement of claim 4, wherein the spring means comprises a wave spring washer.

6. The improvement of claim 4, wherein the spring means comprises a belleville washer.

* * * * *